United States Patent
Hirose

(10) Patent No.: US 8,493,485 B2
(45) Date of Patent: Jul. 23, 2013

(54) IMAGE PICKUP DEVICE, IMAGE PICKUP APPARATUS, CONTROL METHOD, AND PROGRAM

(75) Inventor: Minoru Hirose, Tokyo (JP)

(73) Assignee: Canon Kabushiki Kaisha (JP)

( * ) Notice: Subject to any disclaimer, the term of this patent is extended or adjusted under 35 U.S.C. 154(b) by 487 days.

(21) Appl. No.: 12/022,298

(22) Filed: Jan. 30, 2008

(65) Prior Publication Data

US 2008/0180547 A1    Jul. 31, 2008

(30) Foreign Application Priority Data

Jan. 31, 2007    (JP) .................................. 2007-021130

(51) Int. Cl.
*H04N 3/14*       (2006.01)
*H04N 5/235*     (2006.01)

(52) U.S. Cl.
USPC .................. 348/300; 348/229.1; 348/294

(58) Field of Classification Search
USPC ................... 348/294, 300, 301, 707
See application file for complete search history.

(56) References Cited

U.S. PATENT DOCUMENTS

| | | | |
|---|---|---|---|
| 5,712,682 A * | 1/1998 | Hannah | 348/255 |
| 5,987,261 A | 11/1999 | Sugahara et al. | |
| 6,801,598 B2 | 10/2004 | Tashiro et al. | |
| 7,728,893 B2 | 6/2010 | Kagawa et al. | |
| 7,830,436 B2 * | 11/2010 | Sumi et al. | 348/300 |
| 2003/0189651 A1 * | 10/2003 | Gaylord | 348/229.1 |
| 2003/0222996 A1 * | 12/2003 | Patej | 348/255 |
| 2005/0185075 A1 * | 8/2005 | Neter | 348/294 |
| 2007/0007438 A1 * | 1/2007 | Liu et al. | 250/214 AG |
| 2007/0146514 A1 * | 6/2007 | Maeda et al. | 348/294 |
| 2007/0242145 A1 | 10/2007 | Hazelwood et al. | |
| 2007/0272871 A1 * | 11/2007 | Schafer et al. | 250/370.09 |
| 2009/0052878 A1 * | 2/2009 | Warpakowski Furlan | 396/6 |
| 2009/0284626 A1 * | 11/2009 | Arakawa | 348/255 |
| 2010/0091164 A1 * | 4/2010 | Panicacci | 348/308 |
| 2010/0110224 A1 * | 5/2010 | Kakinuma et al. | 348/223.1 |

FOREIGN PATENT DOCUMENTS

| | | |
|---|---|---|
| JP | 11-084489 A | 3/1999 |
| JP | 2000-187266 A | 7/2000 |
| JP | 2001-042396 A | 2/2001 |

(Continued)

OTHER PUBLICATIONS

Japanese Office Action for corresponding JP 2007-021130, dated Nov. 22, 2011.

(Continued)

*Primary Examiner* — Hung Lam
(74) *Attorney, Agent, or Firm* — Rossi, Kimms & McDowell LLP

(57) ABSTRACT

An image pickup device which makes it possible to expand the dynamic range of photometry. The image pickup device comprises a pixel array, a pixel reader, a row selector, a column selector, a gain circuit, a gain selector. The pixel array comprises a plurality of pixels including photoelectric conversion elements and arranged in the horizontal direction and in the vertical direction. The pixel reader reads out selected pixel signals from the pixel array. The gain circuit is capable of having at least two gains set therein, and amplifies and outputs the pixel signals read out from the pixel array by the pixel reader. The gain selector sets different gains in the gain circuit such that pixel signals amplified by the different gains can be obtained for one-time read-out from the pixel array by the pixel reader.

7 Claims, 14 Drawing Sheets

FOREIGN PATENT DOCUMENTS

| | | |
|---|---|---|
| JP | 2003-126072 A | 5/2003 |
| JP | 2003-319255 A | 11/2003 |
| JP | 2004-282552 A | 10/2004 |
| JP | 2004-336468 A | 11/2004 |
| JP | 2004-117192 A | 4/2005 |
| JP | 2006-253876 A | 9/2006 |
| JP | 2006-319684 A | 11/2006 |
| JP | 2006528444 A | 12/2006 |
| JP | 2008154818 A | 7/2008 |
| WO | 2006/048987 A1 | 5/2006 |

OTHER PUBLICATIONS

Japanese Office Action issued in counterpart application No. JP2007-021130, dated Apr. 3, 2012.

Office Action issued in corresponding Japanese Patent Application 2007-021130 dated Sep. 25, 2012.

* cited by examiner

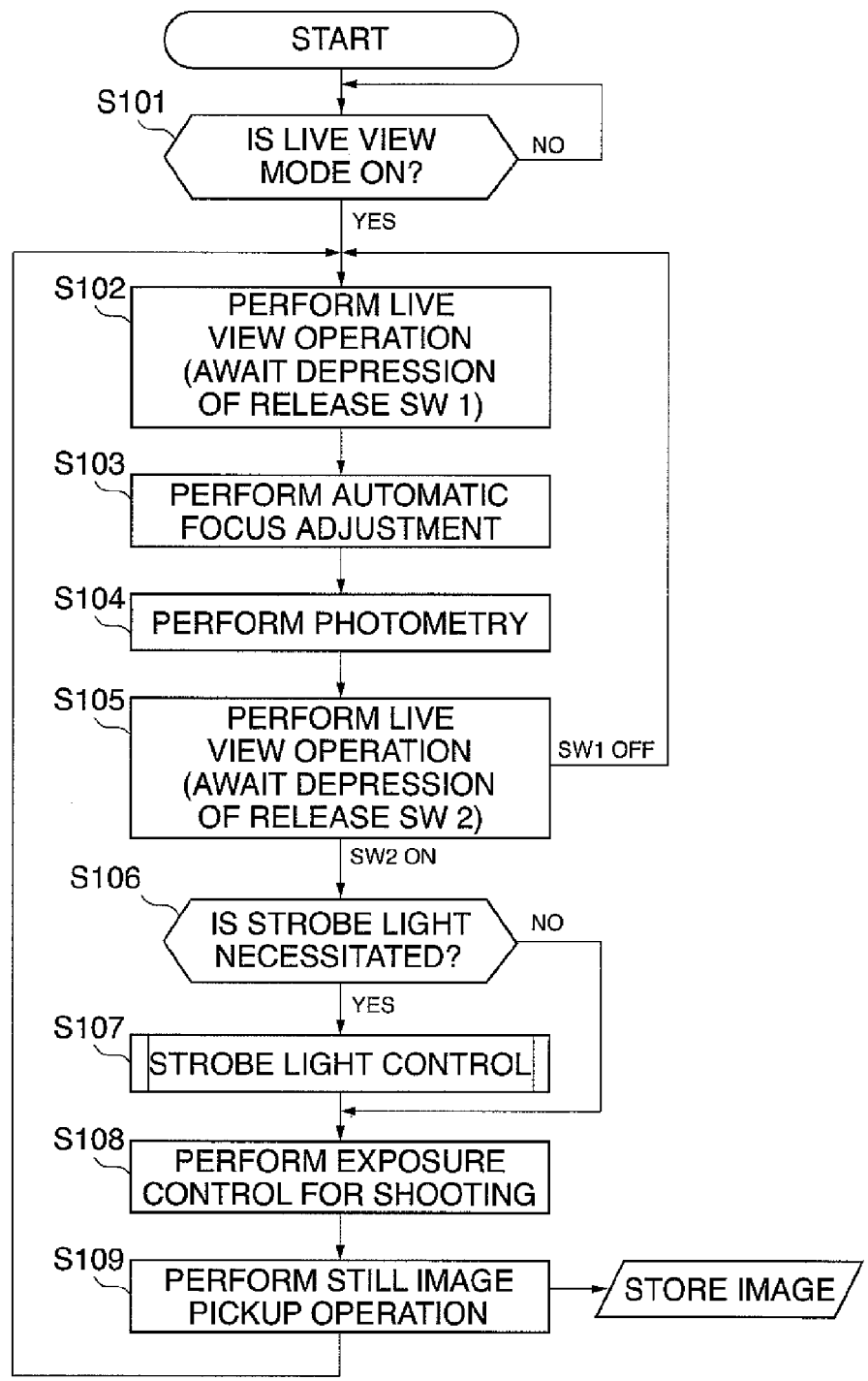

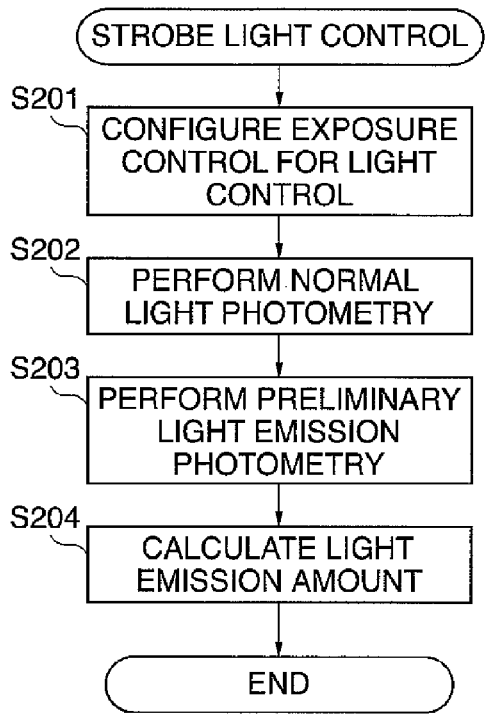
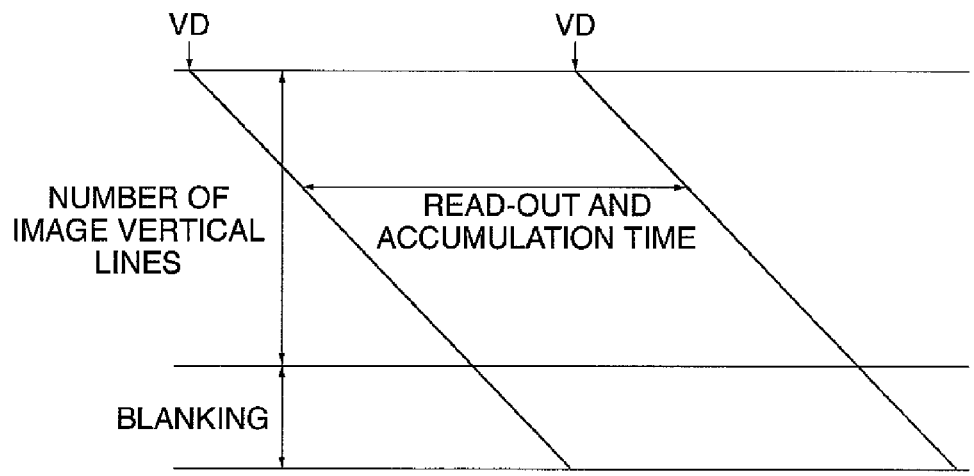

SLIT ROLLING SHUTTER READ-OUT METHOD

IMAGE PICKUP DEVICE, IMAGE PICKUP APPARATUS, CONTROL METHOD, AND PROGRAM

BACKGROUND OF THE INVENTION

1. Field of the Invention

The present invention relates to an image pickup device adapted to expand the dynamic range of photometry, an image pickup apparatus including the image pickup device, a method of controlling the image pickup apparatus, and a program for implementing the control method.

2. Description of the Related Art

Today, to perform photometry for controlling exposure, many image pickup apparatuses employ either a method using a compression sensor for use in photometry or a method using a linear sensor, such as an image pickup surface. The method using a linear sensor has a smaller measurable dynamic range than the measurable dynamic range provided by the method using a compression sensor, and hence cannot accurately photometer an object of high contrast.

Particularly in a case where strobe light control is performed prior to strobe shooting by measuring the amount of reflected light reflected from an object by preliminary light emission and calculating the amount of light to be emitted for the shooting based on the measured reflected light amount, the amount of reflected light differs largely depending on a shooting situation. For this reason, the result of exposure at the preliminary light emission may not fall in the dynamic range of the linear sensor, causing a blackout condition or saturation. In such a case, it is impossible to perform accurate photometry by one-time exposure.

To cope with the above-mentioned problem, there has been proposed the following technique (see e.g. Japanese Laid-Open Patent Publication (Kokai) No. 2000-187266), in which it is determined, based on the result of photometry performed by preliminary light emission, whether or not preliminary light emission is required to be performed once again, and if it is determined that preliminary light emission is required to be performed again, photometry is carried out again by preliminary light emission after changing exposure conditions.

Further, a technique for expanding the dynamic range of the linear sensor has been proposed the following technique (see e.g. Japanese Laid-Open Patent Publication (Kokai) No. 2005-117192), in which using a solid-state image pickup apparatus, a plurality of kinds of summations of pixel signals of the same color are performed to generate signals different in the number of added pixel signals, and photometry is carried out based on the output signals.

However, in the technique disclosed in Japanese Laid-Open Patent Publication (Kokai) No. 2000-187266, it is required to carry out preliminary light emission for photometry a plurality of times, which increases a release time lag between a time point a release switch operates upon depression of a shutter button of the image pickup apparatus and a time point shooting starts to be executed.

Further, the technique disclosed in Japanese Laid-Open Patent Publication (Kokai) No. 2005-117192 is not very compatible with a live view function (i.e. a function of checking a composition and focusing while displaying an image formed on an image pickup device in real time) which is realized using a CMOS as the image pickup device. More specifically, the pixel summations cause degraded resolution, which results in lowered photometric accuracy.

Differently from a CCD image pickup device, the CMOS image pickup device is not capable of transferring electric charges in a single operation, and hence pixel signals are sequentially read out. For this reason, in a situation where a mechanical shutter cannot be used as in the case where live view is being performed, exposure is continued even during pixel signal read-out operation. This makes it necessary, when luminance is high, to speed up a read-out operation for reading out pixel signals from the image pickup device by thinning-out reading to prevent normal light from causing saturation of pixel signals, thereby reducing accumulation time.

However, when the pixel summation method proposed in Japanese Laid-Open Patent Publication (Kokai) No. 2005-117192 is employed to expand the dynamic range using the CMOS as the image pickup device, not only thinning-out reading of pixel signals but also the pixel summation causes degraded resolution. This causes the problem of lowered photometric accuracy. If it is possible to secure a resolution high enough not to affect photometric accuracy, it is desired to further increase a thinning rate to achieve high-speed read-out of pixel signals so as to expand the photometric dynamic range toward a high luminance side.

SUMMARY OF THE INVENTION

The present invention provides an image pickup device, an image pickup apparatus including the image pickup device, a method of controlling the image pickup apparatus, and a program for implementing the control method, which make it possible to expand the dynamic range of photometry.

In a first aspect of the present invention, there is provided an image pickup device comprising a pixel array formed by a plurality of pixels including photoelectric conversion elements and arranged in a horizontal direction and in a vertical direction, a pixel read-out unit configured to read out selected pixel signals from the pixel array, an amplifier unit configured to be capable of having at least two gains set therein, and amplify and output the pixel signals read out from the pixel array by the pixel read-out unit, and a gain-setting unit configured to set different gains in the amplifier unit such that pixel signals amplified by the different gains can be obtained upon one-time read-out from the pixel array by the pixel read-out unit.

With the arrangement of the image pickup device according to the first aspect of the present invention, the gains are set in the amplification unit such that image signals amplified by the respective different gains can be obtained from the image pickup device by each single read-out operation for reading out pixel signals from the pixel array. This makes it possible to obtain image signals amplified by the respective different gains, from the image pickup device in each single read-out operation, whereby it is possible to expand the dynamic range of photometry. Further, since photometry is performed using at least one of a plurality of kinds of pixel signals amplified by the respective different gains and obtained from the image pickup device through preliminary light emission, it is possible to expand the dynamic range of photometry, and perform accurate photometry by one-time exposure.

The image pickup device further comprises a row-selecting unit configured to select a plurality of pixels from the pixel array in the horizontal direction, and the gain-setting unit can set gains for rows selected by the row-selecting unit at intervals of a predetermined number of rows.

The image pickup device further comprises a column-selecting unit configured to select a plurality of pixels from the pixel array in the vertical direction, and the gain-setting unit can set gains for columns selected by the column-selecting unit at intervals of a predetermined number of columns.

The pixel read-out unit is capable of performing pixel-thinning out for the pixel array in the horizontal direction or in the vertical direction at predetermined thinning intervals to read out the pixel signals.

In a second aspect of the present invention, there is provided an image pickup apparatus comprising an image pickup device including a pixel array formed by a plurality of pixels including photoelectric conversion elements and arranged in a horizontal direction and in a vertical direction, a pixel read-out unit configured to read out selected pixel signals from the pixel array, an amplifier unit configured to be capable of having at least two gains set therein, and amplify and output the pixel signals read out from the pixel array by the pixel read-out unit, and a gain-setting unit configured to set different gains in the amplifier unit such that pixel signals amplified by the different gains can be obtained upon one-time read-out from the pixel array by the pixel read-out unit, a photometric unit configured to measure reflected light from an object caused by preliminary light emission performed before shooting, based on the pixel signals read out from the image pickup device, a light emission amount-calculating unit configured to calculate a light emission amount required for the shooting, based on a result of the photometric measurement by the photometric unit, a light-emitting unit configured to emit light in an amount corresponding to a result of the calculation by the light emission amount-calculating unit, and a preliminary light emission photometric unit configured to control the amplifier unit for accumulation of pixel signals in the image pickup device during the preliminary light emission, and perform photometry using at least one of a plurality of kinds of pixel signals amplified by different gains and obtained from the image pickup device.

The image pickup apparatus further comprises a normal light photometric unit configured to control the amplifier unit for accumulation of pixel signals in the image pickup device under a normal light condition, and perform normal light photometry using at least one of a plurality of kinds of pixel signals amplified by different gains and obtained from the image pickup device, and gain configuration of the amplifier unit for the accumulation of pixel signals in the image pickup device under the normal light condition is identical to gain configuration of the amplifier unit for the accumulation of pixel signals in the image pickup device during the preliminary light emission.

The image pickup apparatus can have a live view function for sequentially display images based on the pixel signals read out from the image pickup device.

In a third aspect of the present invention, there is provided a method of controlling an image pickup apparatus having an image pickup device including a pixel array formed by a plurality of pixels including photoelectric conversion elements and arranged in a horizontal direction and in a vertical direction, a pixel read-out unit configured to read out selected pixel signals from the pixel array, an amplifier unit configured to be capable of having at least two gains set therein, and amplify and output the pixel signals read out from the pixel array by the pixel read-out unit, and a gain-setting unit configured to set different gains in the amplifier unit such that pixel signals amplified by the different gains can be obtained upon one-time read-out from the pixel array by the pixel read-out unit, the method comprising a photometric measurement step of measuring reflected light from an object caused by preliminary light emission performed before shooting, based on the pixel signals read out from the image pickup device, a light emission amount-calculating step of calculating a light emission amount required for the shooting, based on a result of the photometric measurement in the photometric measurement step, a light-emitting step of emitting light in an amount corresponding to a result of the calculation in the light emission amount-calculating step, and a preliminary light emission photometric measurement step of controlling the amplifier unit for accumulation of pixel signals in the image pickup device during the preliminary light emission, and perform photometry using at least one of a plurality of kinds of pixel signals amplified by different gains and obtained from the image pickup device.

In a fourth aspect of the present invention, there is provided a program for causing a computer to execute a method of controlling an image pickup apparatus having an image pickup device including a pixel array formed by a plurality of pixels including photoelectric conversion elements and arranged in a horizontal direction and in a vertical direction, a pixel read-out unit configured to read out selected pixel signals from the pixel array, an amplifier unit configured to be capable of having at least two gains set therein, and amplify and output the pixel signals read out from the pixel array by the pixel read-out unit, and a gain-setting unit configured to set different gains in the amplifier unit such that pixel signals amplified by the different gains can be obtained upon one-time read-out from the pixel array by the pixel read-out unit, the program comprising a photometric module for measuring reflected light from an object caused by preliminary light emission performed before shooting, based on the pixel signals read out from the image pickup device, a light emission amount-calculating module for calculating a light emission amount required for the shooting, based on a result of the photometric measurement by the photometric measurement module, a light-emitting module for emitting light in an amount corresponding to a result of the calculation by the light emission amount-calculating module, and a preliminary light emission photometric module for controlling the amplifier unit for accumulation of pixel signals in the image pickup device during the preliminary light emission, and perform photometry using at least one of a plurality of kinds of pixel signals amplified by different gains and obtained from the image pickup device.

The features and advantages of the invention will become more apparent from the following detailed description taken in conjunction with the accompanying drawings.

BRIEF DESCRIPTION OF THE DRAWINGS

FIG. 6 is a flowchart of a shooting process carried out by the image pickup apparatus.

FIG. 7 is a flowchart of a strobe light control process.

FIG. 8 is a schematic diagram showing a read-out time and an accumulation time in an image pickup device drive method (rolling shutter read-out method).

DETAILED DESCRIPTION OF THE PREFERRED EMBODIMENTS

The present invention will now be described in detail with reference to the drawings showing a preferred embodiment thereof.

Figure 1:
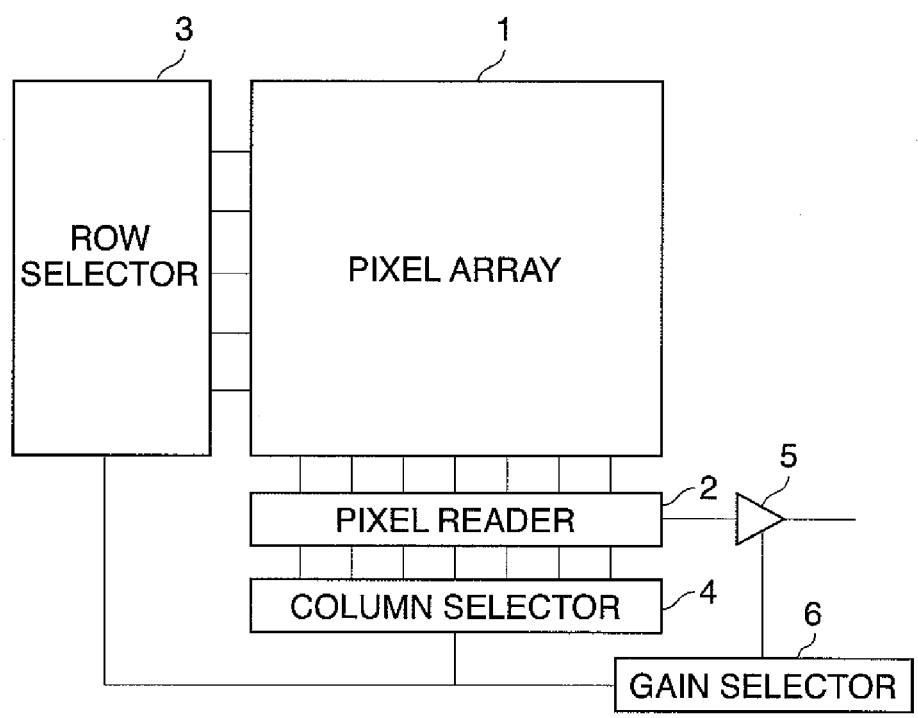
FIG. 1 is a block diagram of a solid-state image pickup device according to a first embodiment of the present invention.

FIG. 1 is a block diagram of a solid-state image pickup device according to a first embodiment of the present invention.

Referring to FIG. 1, the solid-state image pickup device (hereinafter simply referred to as "the image pickup device") according to the present embodiment is capable of obtaining output signals for different levels of brightness in each single read-out operation. The image pickup device is comprised of a pixel array 1, a pixel reader 2, a row selector 3, a column selector 4, a gain circuit 5, and a gain selector 6.

The pixel array 1 is comprised of a plurality of pixels, including photoelectric conversion elements, which are arranged in a horizontal direction and in a vertical direction. The row selector 3 selects a plurality of pixels from the pixel array 1 in the horizontal direction. The column selector 4 selects a plurality of pixels from the pixel array 1 in the vertical direction. The pixel reader 2 is capable of reading out pixels from the pixel array 1 at a high speed by performing pixel thinning in the horizontal direction or in the vertical direction at predetermined intervals. The pixel reader 2 sequentially reads out pixel signals selected by each of the row selector 3 and the column selector 4.

The gain selector 6 sets a plurality of kinds of different gains for each of the rows and columns of the pixel array 1 of the gain circuit 5 for one-time read-out of pixel signals. The gain circuit 5 is configured such that a plurality of kinds of different gains can be set therein, and amplifies and outputs pixel signals based on associated gains selected by the gain selector 6. The gain selector 6 sets gains in the gain circuit 5 for respective rows selected from the pixel array 1 by the row selector 3 at intervals of a predetermined number of rows. Further, the gain selector 6 sets gains in the gain circuit 5 for respective columns selected from the pixel array 1 by the column selector 4 at intervals of a predetermined number of columns.

Figure 2:
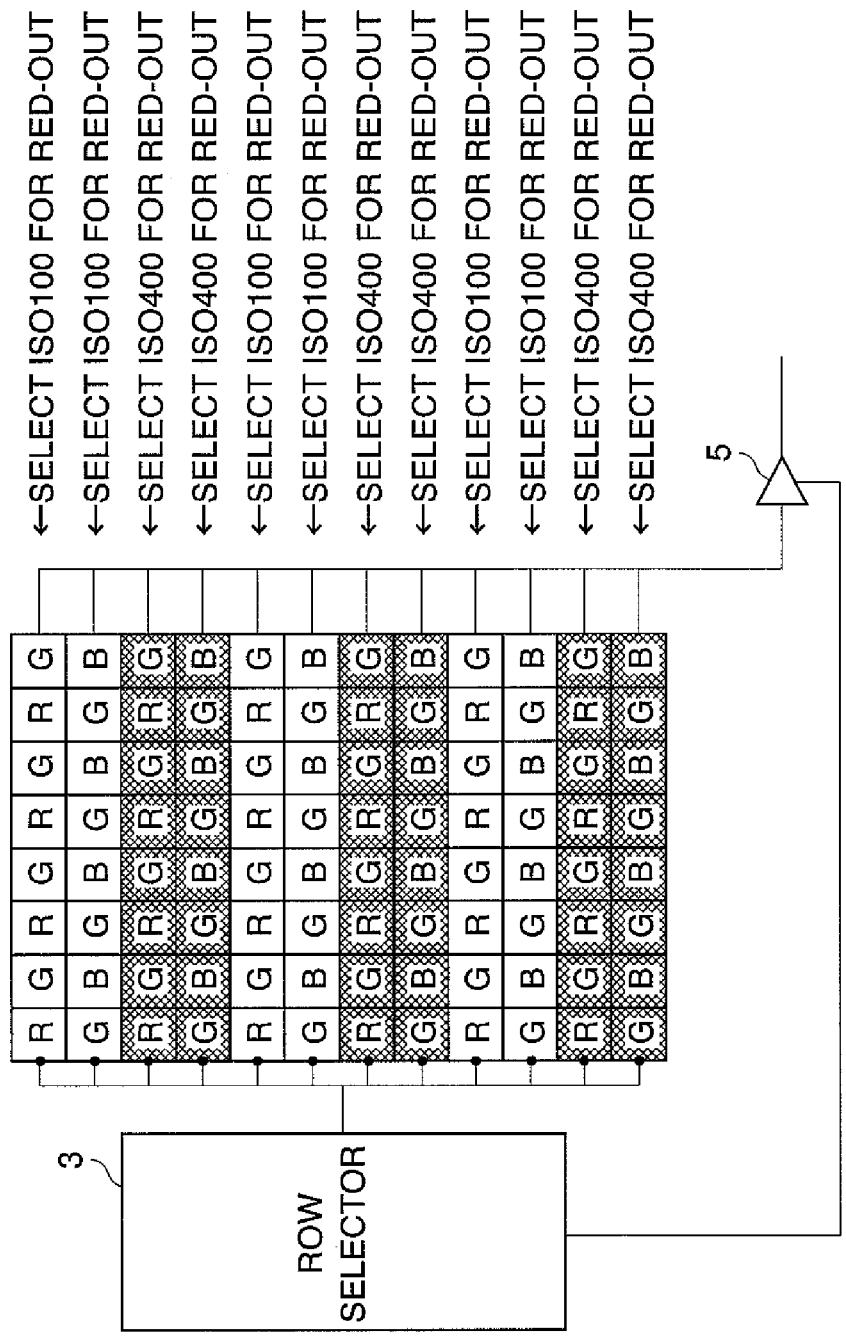
FIG. 2 is a schematic view useful in explaining read gains for respective pixel rows.

FIG. 2 is a schematic view useful in explaining read gains for respective pixel rows.

FIG. 2 illustrates an example of selection of gains by the gain selector 6 for read-out of respective pixel signals from the pixel array shown in FIG. 1. A gain ISO100 and a gain ISO400 are alternately selected every two rows of the pixel array, and signals amplified by two different kinds of gains, respectively, are read out in each single pixel signal read-out operation. In the present embodiment, the pixel array is illustrated by 12 rows×8 columns for simplicity of explanation. It should be noted that although in the present embodiment, the two gains ISO100 and ISO400 are selected, the values and kinds of gains to be selected are not limited to those in the above-described example.

Figure 3:
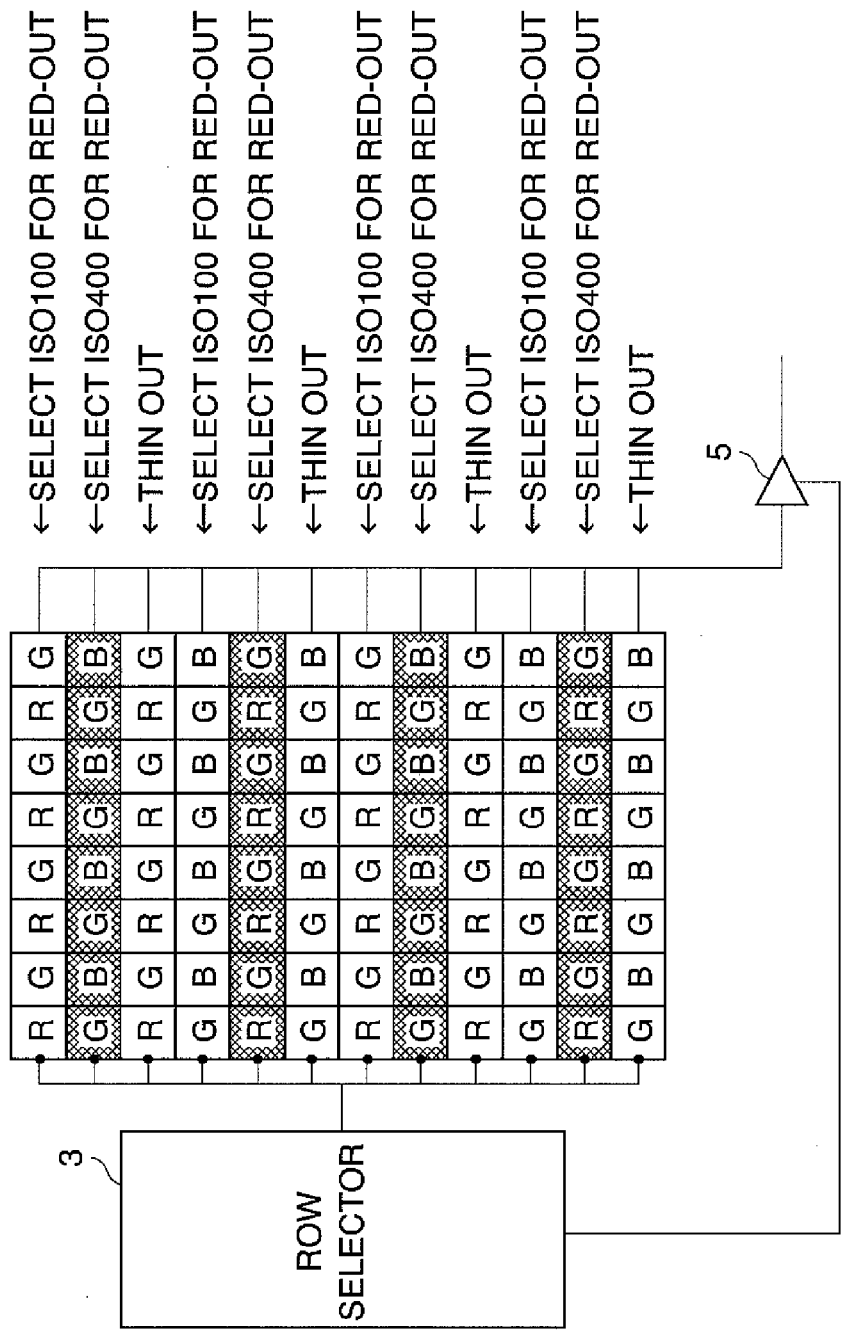
FIG. 3 is a schematic view useful in explaining read gains for respective pixel rows.

FIG. 3 is a schematic view useful in explaining read gains for respective pixel rows.

FIG. 3 illustrates an example of a case where pixels are read out by thinning-out reading from the pixel array shown in FIG. 2. In the present embodiment, a read-out operation is performed while thinning out one for every three rows, and the gains ISO100 and ISO400 are selected alternately for the rows read out. By thus carrying out thinning-out reading of pixels, it is possible to increase the speed at which each read-out operation is performed. Although in the present embodiment, a read-out operation is performed while thinning out one for every three rows (i.e. at a one-third thinning-out interval), this is not limitative.

Figure 4:
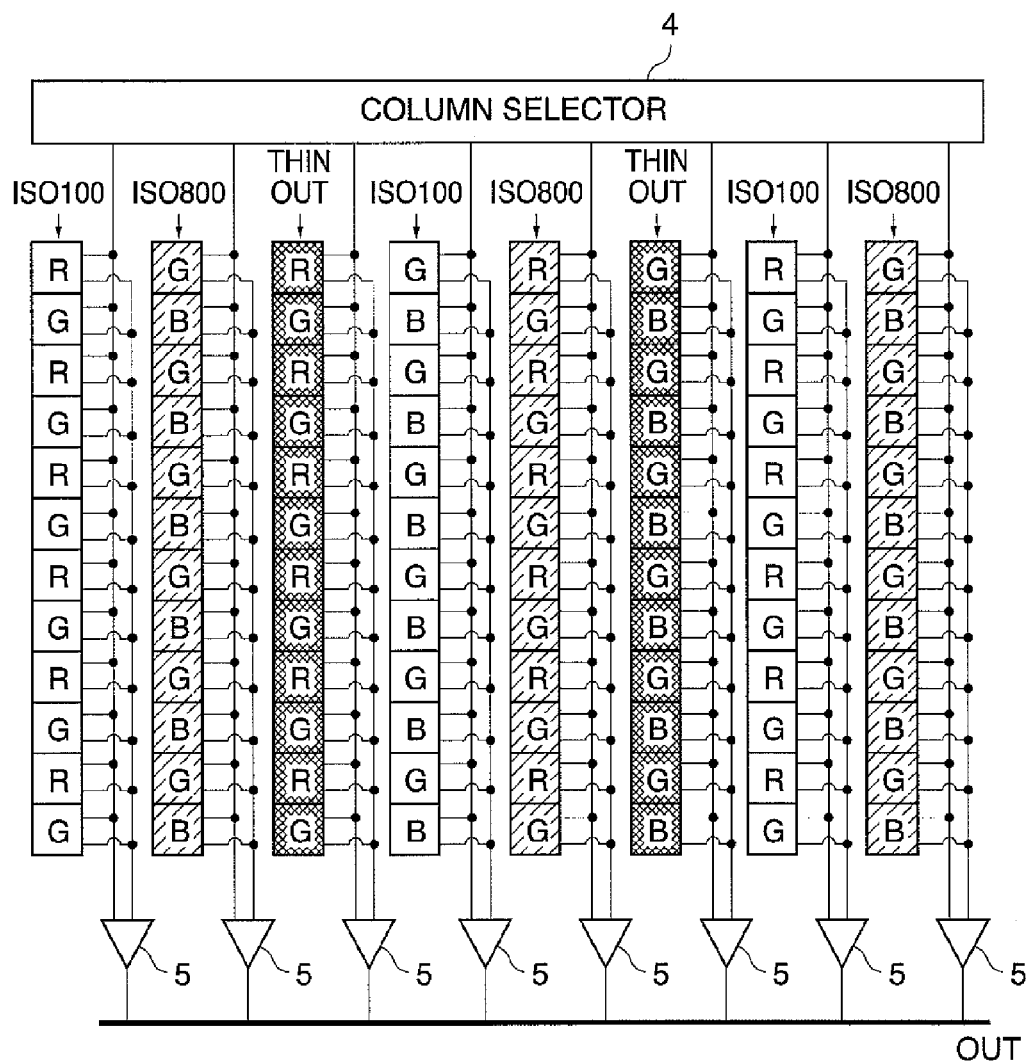
FIG. 4 is a schematic view useful in explaining read gains for respective pixel columns.

FIG. 4 is a schematic view useful in explaining read gains for respective pixel columns.

FIG. 4 shows an example of a case where a gain for a pixel signal to be read out is selected by the gain selector 6 for each column of the pixel array, and a read-out operation is performed while thinning out one for every three columns. In the present embodiment, the gain ISO100 and a gain ISO800 are alternately selected for columns to be read out. Although in the present embodiment, one column is thinned out every three columns of the pixel array, and the two different kinds of gains are selected, the thinning-out interval, the gain values, and the number of kinds of gains are not limited to those in the above-described example.

As described above, according to the present embodiment, it is possible to obtain image signal outputs amplified by a plurality of different kinds of gains, in a single read-out operation. This makes it possible to expand the dynamic range of image signal outputs obtained by one-time exposure. The same advantageous effects as described above can be obtained in a case where high-speed read-out of pixels from the pixel array is performed by executing thinning-out reading of pixels therefrom in combination.

Figure 5:
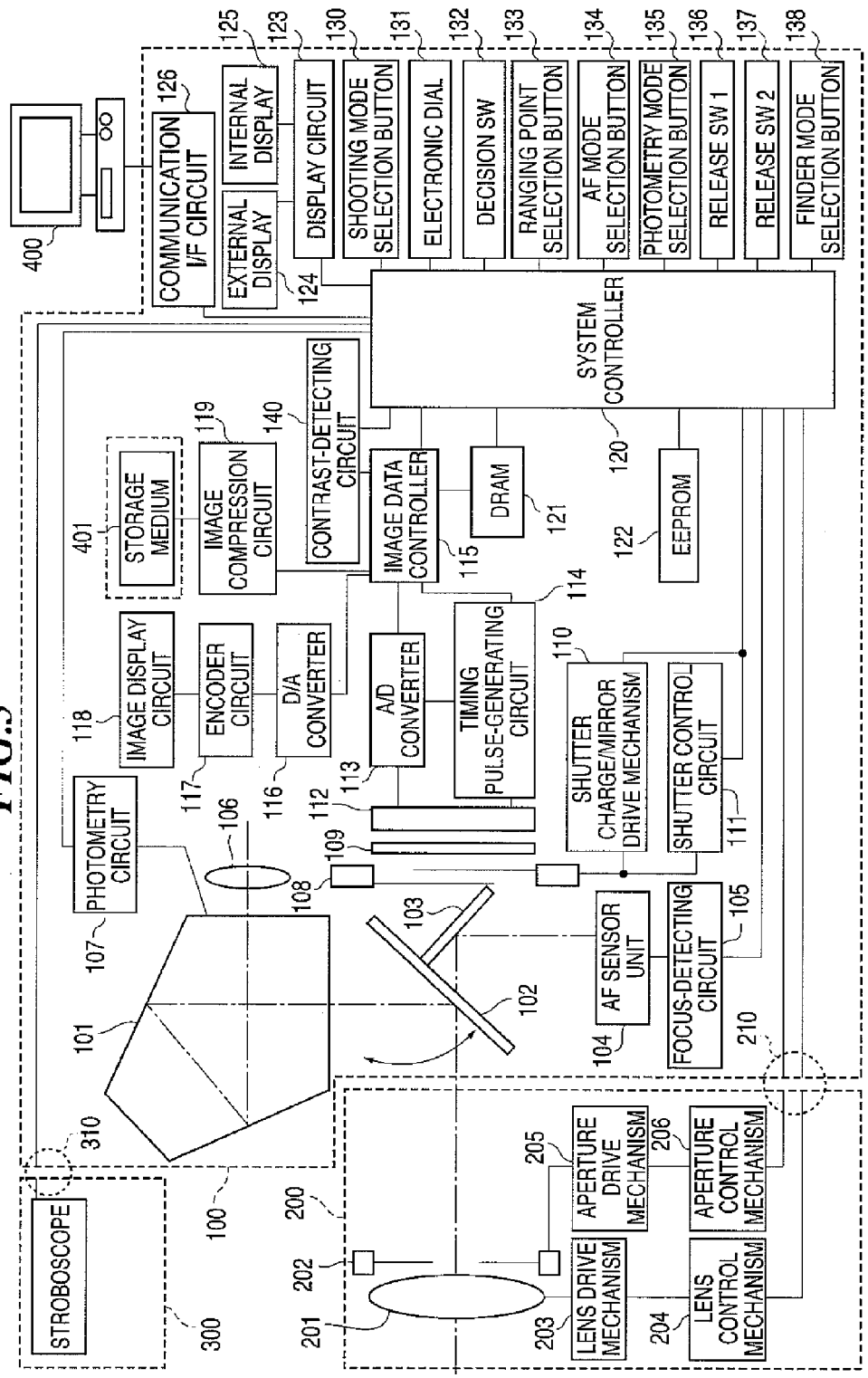
FIG. 5 is a block diagram of a digital camera system as an image pickup apparatus according to a second embodiment of the present invention.

FIG. 5 is a block diagram of a digital camera system as an image pickup apparatus according to a second embodiment of the present invention.

As shown in FIG. 5, the digital camera system is a digital single-lens reflex camera (hereinafter simply referred to as "the digital camera") 100, a photographic lens unit 200, and a stroboscopic device 300 with the camera 100 is equipped. The digital camera 100 includes an optical mechanism, various kinds of circuits, various kinds of operation buttons, referred to hereinafter, and a system controller (CPU) 120. The photographic lens unit 200 is detachably attached to the digital camera 100 via a mount mechanism (not shown). The photographic lens unit 200 includes a photographic lens 201, and an aperture 202. The mount mechanism has an electric contact group 210. The system controller 120 and the electric contact group 210 constitute a lens-detecting section.

The electric contact group 210 has a function of transferring control signals, state signals, data signals, and so forth, between the digital camera 100 and the photographic lens unit 200. The electric contact group 210 also has a function of supplying various kinds of voltages and electric currents and a function of transmitting signals to the system controller 120 when the photographic lens unit 200 is connected to the digital camera 100. Communication between the digital camera 100 and the photographic lens unit 200 makes it possible to drive the photographic lens 201 and the aperture 202 within the photographic lens unit 200. The electric contact group 210 may be configured to have not only the function for electrical communication, but also a function for optical communication, a function for voice communication, and like functions.

Although in the present embodiment, only a single photographic lens is shown in FIG. 5 for convenience of description, it is to be understood that the photographic lens unit 200 has a larger number of photographic lenses in actuality.

In accordance with a shooting operation by the image pickup apparatus, photographic light flux from an object (not shown) is guided through the photographic lens 201 and the aperture 202 to a quick return mirror 102 which can be driven in a direction indicated by an arrow in FIG. 5. The quick return mirror 102 has a central part thereof formed as a half mirror. When the quick return mirror 102 is in its down position, part of photographic light flux passes through the central part of the quick return mirror 102. The photographic light flux having passed through the quick return mirror 102 is reflected downward by a sub mirror 103 attached to the quick return mirror 102.

An AF sensor unit 104, which executes a known phase difference-detecting method, is comprised of a field lens disposed in the vicinity of an image forming surface, a reflective mirror, a secondary image forming lens, an aperture, and a line sensor comprised of a plurality of CCDs, none of which are shown. A focus-detecting circuit 105 controls the AF sensor unit 104 based on a control signal from the system controller 120 to thereby perform focus detection by the phase difference-detecting method. The AF sensor unit 104 and the focus-detecting circuit 105 constitute a focus-detecting section.

On the other hand, photographic light flux reflected by the quick return mirror 102 reaches a photographer's eye through a pentagonal prism 101 and an eyepiece 106. When the quick return mirror 102 is in its up position, photographic light flux having passed through the photographic lens 201 reaches an image sensor 112 as an image pickup device through a focal plane shutter 108 as a mechanical shutter and a filter 109. The image sensor 112 is specifically implemented by a CMOS image sensor.

It should be noted that the image sensor 112 corresponds to the solid-state image pickup device described in the first embodiment. The image sensor 112 is a solid-state image pickup device capable of setting gains at predetermined intervals for respective rows selected by the row selector and obtaining output signals for different levels of brightness in a single read-out operation. Further, it is assumed that the image sensor 112 is capable of reading out pixel signals at a high speed while thinning out pixels in the horizontal direction and the vertical direction.

The filter 109 has both a function of filtering out infrared radiation and guiding only visible radiation to the image sensor 112 and a function as an optical low-pass filter. The focal plane shutter 108 has front and rear curtains and controls transmission and blockage of light flux from the photographic lens 201. It should be noted that when the quick return mirror 102 is in its up position, the sub mirror 103 is held in a folded state.

The system controller 120 is formed by the CPU that controls the overall operation of the digital camera system. The system controller 120 controls the operation of each section, described hereinafter, as required, and executes processes described hereinafter with reference to FIGS. 6 and 7, based on programs. Further, the system controller 120 has a photometric function and a light emission amount-calculating function. A lens control circuit 204 and an aperture control circuit 206 are connected to the system controller 120. The lens control circuit 204 controls a lens drive mechanism 203 for moving the photographic lens 201 in the optical axis direction for focusing. The aperture control circuit 206 controls an aperture drive mechanism 205 for driving the aperture 202.

Further, a shutter charge/mirror drive mechanism 110, a shutter control circuit 111, and a photometry circuit 107 are connected to the system controller 120. The shutter charge/mirror drive mechanism 110 controls driving of the up/down operation of the quick return mirror 102 and the shutter charge of the focal plane shutter 108. The shutter control circuit 111 controls the travel of each of the front and rear curtains of the focal plane shutter 108. The photometry circuit 107 is connected to a photometric sensor (not shown) disposed in the vicinity of the eyepiece 106 to perform automatic exposure.

Further, an EEPROM 122 is connected to the system controller 120. The EEPROM 122 stores parameters required to be adjusted for controlling the digital camera system, camera ID information for identifying the digital camera, AF correction data adjusted by a reference lens, automatic exposure correction values, and so forth.

The lens control circuit 204 includes a lens storage section (not shown) storing lens-specific information (focal distances of the respective lenses, wide open aperture value, lens IDs assigned to the respective lenses, etc., for example) and information received from the system controller 120. The photometric sensor connected to the photometry circuit 107 is configured to measure the luminance of an object, and an output therefrom is delivered to the system controller 120 via the photometry circuit 107.

The system controller 120 controls the lens drive mechanism 203 by the lens control circuit 204 to thereby form the image of an object on the image sensor 112. Further, the system controller 120 controls the aperture drive mechanism 205 by the aperture control circuit 206 based on a set Av (aperture amount) value, and outputs a control signal to the shutter control circuit 111 based on a set Tv (parameter corresponding to the shutter speed) value.

The front and rear curtains of the focal plane shutter 108 have a drive source formed by a spring, and hence need spring charge for an operation following shutter travel. The shutter charge/mirror drive mechanism 110 is configured to control the spring charge. Further, the shutter charge/mirror drive mechanism 110 turns up/down the quick return mirror 102, as described hereinabove.

Further, an image data controller 115 is connected to the system controller 120. The image data controller 115 is implemented by a DSP (digital signal processor), and performs control of the image sensor 112 and correction/processing of image data received from the image sensor 112 in response to instructions from the system controller 120. The image data correction/processing includes auto white balance correction. The auto white balance is a function of correcting a maximum-luminance portion of a picked-up image to a predetermined color (white). The amount of the correction can be changed following a command from the system controller 120.

The system controller 120 and the image data controller 115 constitute a second photometry section. The second photometry section performs the following processing: The image data controller 115 divides an image signal into regions, and delivers values obtained by performing Bayer pixel-by-Bayer pixel integration in the respective regions to the system controller 120. The system controller 120 performs photometry by evaluating the integrated signals.

Connected to the image data controller 115 are a timing pulse-generating circuit 114, an A/D converter 113, a D/A converter 116, an image compression circuit 119, a DRAM 121, and a contrast-detecting circuit 140. The timing pulse-generating circuit 114 outputs a pulse signal required for driving the image sensor 112.

Together with the image sensor 112, the A/D converter 113 receive the timing pulse generated by the timing pulse-generating circuit 114, and converts an analog signal associated with an object image output from the image sensor 112 into a digital signal. The DRAM 121 temporarily stores obtained image data (digital signals). More specifically, the DRAM 121 is used to temporarily store image data to be subjected to processing and data conversion into a predetermined format.

A storage medium 401 is connected to the image compression circuit 119. The image compression circuit 119 is configured to perform compression and conversion (e.g. JPEG compression) of image data stored in the DRAM 121. Image data subjected to the conversion is stored in the storage medium 401. The storage medium is implemented e.g. by a hard disk, a flash memory or a floppy (registered trademark) disk. It should be noted that the image data controller 115, the image compression circuit 119, and the storage medium 401 constitute a recording section.

An image display circuit 118 is connected to the D/A converter 116 via an encoder circuit 117. The image display circuit 118 displays image data picked up by the image sensor 112. The image display circuit 118 is generally implemented by a color liquid crystal display device.

The image data controller 115 converts image data stored in the DRAM 121 into an analog signal by the D/A converter 116, and outputs the analog signal to the encoder circuit 117. The encoder circuit 117 converts the output from the D/A converter 116 into a video signal (e.g. an NTSC signal) required for driving the image display circuit 118. It should be noted that the D/A converter 116, the image display circuit 118, and the encoder circuit 117 constitute an image display section.

Based on instructions from the system controller 120, the contrast-detecting circuit 140 executes the following processing: The contrast-detecting circuit 140 evaluates a contrast in a predetermined direction of an image signal obtained by passing image data corrected by the image data controller 115 through a filter having a predetermined frequency characteristic and performing predetermined gamma processing on the image data. The result of the contrast evaluation is supplied to the system controller 120.

Further, connected to the system controller 120 are a communication I/F circuit 126, an operation display circuit 123, the various kinds of selection buttons, and various kinds of switches. The communication I/F circuit 126 provides interface for communication with an information processing apparatus 400. The operation display circuit 123 causes an external liquid crystal display 124 and an internal liquid crystal display 125 to display information on an operation mode of the digital camera, exposure information (a shutter second time, an aperture value, etc.), and so forth. It should be noted that the operation display circuit 123 and the system controller 120 constitute a display control section.

A shooting mode selection button 130 is operated by the photographer to set a mode for causing the digital camera to perform a desired operation. A ranging point selection button 133 is operated to select a focal point detecting position for use from a plurality of focal point detecting positions provided for the AF sensor unit 104. An AF mode selection button 134 is operated to select an AF mode. A photometry mode selection button 135 is operated to select a photometry mode. A release switch 1 136 is operated to start a shooting preparation operation, such as photometry and ranging. A release switch 2 137 is operated to start an image pickup operation.

A finder mode selection button 138 is operated to switch between an optical finder mode and a live view mode. The optical finder mode makes it possible to check a photographic light flux passing through the eyepiece 106. The live view mode makes it possible to cause the image display circuit 118 to sequentially display object image signals (images) received by the image sensor 112.

Further, the stroboscopic device 300 is attached to the digital camera 100 via a mount mechanism (not shown). The mount mechanism is provided with an electric contact group 310. The electric contact group 310 has a function of transferring control signals, state signals, data signals, and so forth, between the digital camera 100 and the stroboscopic device 300. The electric contact group 310 also has a function of transmitting a signal to the system controller 120 when the stroboscopic device 300 is connected to the digital camera 100. Communication between the digital camera 100 and the stroboscopic device 300 makes it possible to control light emission of a stroboscope. The electric contact group 310 may be configured to have not only the function for electrical communication, but also a function for optical communication, a function for voice communication, and like functions.

Next, the operation of the digital camera system constructed as above will be described in detail with reference to FIGS. 6 to 16.

FIG. 6 is a flowchart of a shooting process carried out by the image pickup apparatus, and FIG. 7 is a flowchart showing a strobe light control process in detail.

As shown in FIG. 6, the system controller 120 of the digital camera determines whether or not the photographer has operated the finder mode selection button 138 to give an instruction for starting (turn-on) of the live view mode (step S101. When the photographer operates the finder mode selection button 138 to notify the system controller 120 of the starting of the live view mode, the system controller 120 performs the following control: The system controller 120 brings the quick return mirror 102 into the UP state and opens the focal plane shutter 108 to thereby perform control such that photographic light flux passing through the photographic lens 200 holds the image sensor 112 in the exposed state.

Next, the system controller 120 performs a live view operation (step S102). More specifically, the system controller 120 switches the method of driving the image sensor 112 to a slit rolling shutter read-out method to convert pixel signals sequentially read out from the image sensor 112 into digital signals by the A/D converter 113. Then, the system controller 120 performs image processing on the digital signals by the image data controller 115, converts the processed digital signals into analog signals by the D/A converter 116, encodes the analog signals, and transmits the encoded analog signals to the DRAM 121. Further, the system controller 120 sequentially displays images on the external liquid crystal display 124.

Now, the method of driving the image sensor 112 during the live view operation will be briefly described with reference to FIGS. 8 and 9. In the case of realizing the live view function, it is required to sequentially read out pixel signals. The CMOS image pickup device is not capable of transferring pixel signals or reading out pixel signals in a single operation as a CCD image pickup device is, and hence a rolling shutter read-out method is generally employed.

In the rolling shutter read-out method shown in FIG. 8, in synchronism with the timing of respective VD (Vertical Drive) signals, pixels are reset, and then electric charges (pixel signals) are accumulated in respective photo diodes (hereinafter referred to as "the PDs") of the image sensor 112 and read out, sequentially from the uppermost line of an image area to the lowermost one, on a horizontal line-by-horizontal line basis. In short, pixel reset is instructed in the timing of each VD signal. For this reason, in one frame of image, there occurs a time lag in the operation of accumulation and read-out from line to line, and a time lag between the uppermost line and the lowermost line depends on the read-out speed per one line and the number of vertical lines. Further, an accumulation time is limited by a time period required for reading out one frame of image.

Figure 9:
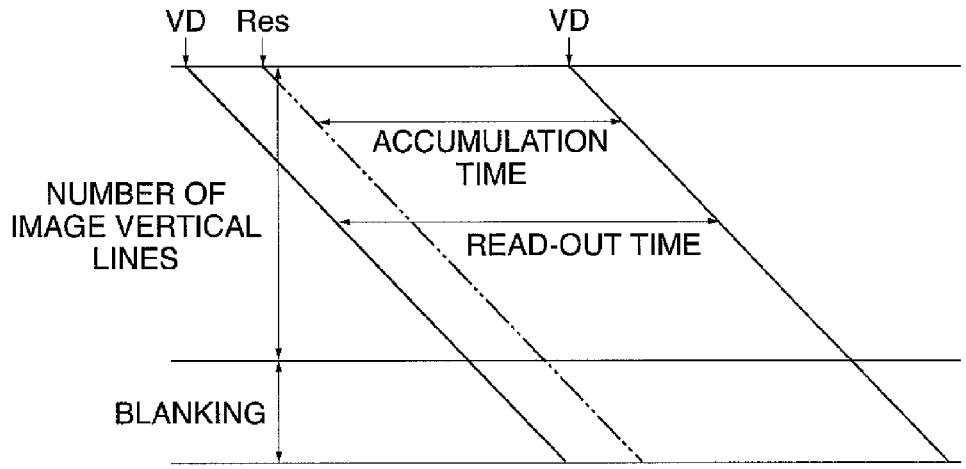
FIG. 9 is a schematic diagram showing a read-out time and an accumulation time in another image pickup device drive method (slit rolling shutter read-out method).

In the slit rolling shutter read-out method shown in FIG. 9, it is possible to perform pixel reset in desired timing along a pixel reset line (slit), thereby resetting electric charges accumulated in the respective PDs to change the accumulation time. In short, pixel reset is instructed in timing different from timing of the VD signal. Further, in the slit rolling shutter read-out method, it is possible to adjust the accumulation time in combination with the automatic exposure control function to thereby obtain pixel signals adjusted to a desired exposure amount from the image pickup device. It should be noted that the reset line is designated by a symbol Rec in FIG. 9.

Further, when the read-out time is limited by frame rate as in the case of the live view operation, it is required to perform reading of only some areas of a full screen area or to perform thinning-out of pixels in the horizontal and vertical directions to thereby read out pixel signals at a high speed.

In the live view operation in the step S102, photometry is performed by the second photometry section (the system controller 120 and the image data controller 115) based on the read-out pixel signals. Further, the aperture and the accumulation time are controlled by the automatic exposure control function, and gains are set in the gain circuit, to thereby adjust exposure. At the same time, strobe automatic light emission determination is performed to automatically determine whether or not to cause the stroboscopic device 300 to emit light.

When the photographer presses the release switch 1 136, the process proceeds to a step S103, wherein the system controller 120 communicates with the lens control circuit 204 based on the result of output from the contrast-detecting circuit 140 and adjusts a focus state. When the focus state is completely adjusted, the process proceeds to a step S104.

Similarly to the live view operation, the system controller 120 performs photometry based on the image signals read out from the image sensor 112 to calculate a Bv value for shooting (step S104). The Bv value is an indicator indicative of a luminance level, and is obtained by an equation of Bv=Tv+Av−Sv. In the equation, Tv represents a parameter corresponding to the shutter speed (corresponding to accumulation time), Av a parameter corresponding to the aperture amount, and Sv a parameter corresponding to the gain level, such as the ISO sensitivity and the like. When photometry is completed, the process proceeds to a step S105.

The system controller 120 holds the Bv value for shooting during a time period over which the release switch 1 136 is kept on, and performs a live view operation (step S105). Further, the system controller 120 continuously performs photometry and strobe automatic light emission determination. When the photographer turns off the release switch 1 136, the system controller 120 abandons the held Bv value for shooting, followed by the process returning to the step S102.

When the photographer presses the release switch 2 137, the system controller 120 determines, based on a strobe light emission condition (forcible light emission, automatic light emission, or inhibition of light emission) configurable by the photographer and the result of the automatic light emission determination, whether or not strobe shooting is to be performed (step S106). If it is determined that strobe shooting is required, the system controller 120 performs strobe light control (step S107). The strobe light control will be described hereinafter with reference to FIG. 7. On the other hand, if it is determined that strobe shooting is not required, the system controller 120 holds the Bv value for shooting, which was calculated in the step S104, and the process proceeds to a step S108.

Referring to FIG. 7, the system controller 120 configures exposure control for photometry (step S201). First, the system controller 120 sets a predetermined aperture value and a predetermined accumulation time based on the latest photometry result obtained in the step S105. Further, the system controller 120 sets a first gain circuit setting to a value corresponding to ISO100, and a second gain circuit setting to a different value (e.g. ISO3200) from the first gain circuit setting.

Figure 10:
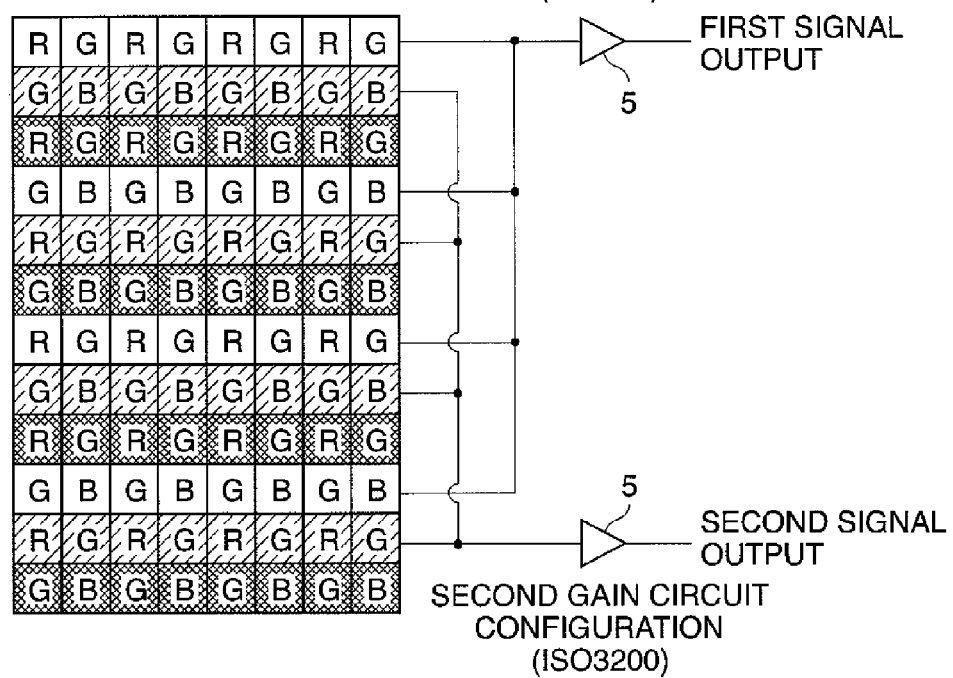
FIG. 10 is a schematic view useful in explaining read gains for respective pixel rows.

Thus, it is possible to obtain a first signal output and a second signal output from the image sensor 112, as shown in FIG. 10. The first signal output and the second signal output are obtained by performing exposure, accumulation, and the read-out in the same timing, so that they are output with the respective exposure levels shifted by a difference between the first and second gain circuit settings. When configuration of exposure control in light control is completed, the process proceeds to a step S202.

The system controller 120 performs normal light photometry for measuring normal light under the exposure conditions set in the step S201 (step S202). Further, the system controller 120 stores a first normal light signal output E1*a* obtained from the first signal output and a second normal light signal output E2*a* obtained from the second signal output in the EEPROM 122. When the normal light photometry is completed, the process proceeds to a step S203.

In the normal light photometry, the gain circuit is adjusted to accumulate pixel signals in the image sensor 112 under a normal light condition, and the normal light photometry is performed using at least one of a plurality of kinds of pixel signals which are different in gain and obtained from the image sensor 112.

The system controller 120 performs preliminary light emission before shooting in a predetermined light emission amount, under the exposure conditions set in the step S201, to thereby carry out preliminary light emission photometry to measure reflected light (mixed light) reflected from an object in the preliminary light emission (step S203). As a result, the system controller 120 can obtain a first preliminary light emission signal output E1*b* from the first signal output and a second preliminary light emission signal output E2*b* from the second signal output. When the preliminary light emission photometry is completed, the process proceeds to a step S204.

In the preliminary light emission photometry, the gain circuit is adjusted to accumulate pixel signals in the image sensor 112 under a preliminary light emission condition, and photometry is performed using at least one of a plurality of kinds of pixel signals which obtained from the image sensor 112 by different gains.

The gain configuration for the gain circuit in the accumulation of pixel signals in the image sensor 112 under the normal light condition is identical to that under the preliminary light emission condition.

The system controller 120 determines the amount of reflected light from the object to be caused light emission by the stroboscopic device 300, using the signal outputs as results of the respective steps S202 and S203, and calculates the amount of light emission required for the main shooting (step S204). The amount of reflected light to be reflected from the object can be calculated in the following manner: A first reflected light amount R1 and a second reflected light amount R2 can be calculated by determining respective differences between the first and second preliminary light emission signal outputs (E1b and E2b) obtained in the step S203 and the first and second normal light signal outputs (E1a and E2a) obtained in the step S202.

$$R1 = E1b - E1a$$

$$R2 = E2b - E2a$$

Further, the amount of light emission is calculated based on the obtained first and second reflected light amounts R1 and R2 and the exposure parameters, such as the shutter speed, the aperture value, the ISO sensitivity for shooting, which were obtained from the photometry executed in the step S104. It should be noted that this does not apply to manual exposure.

Figure 11:
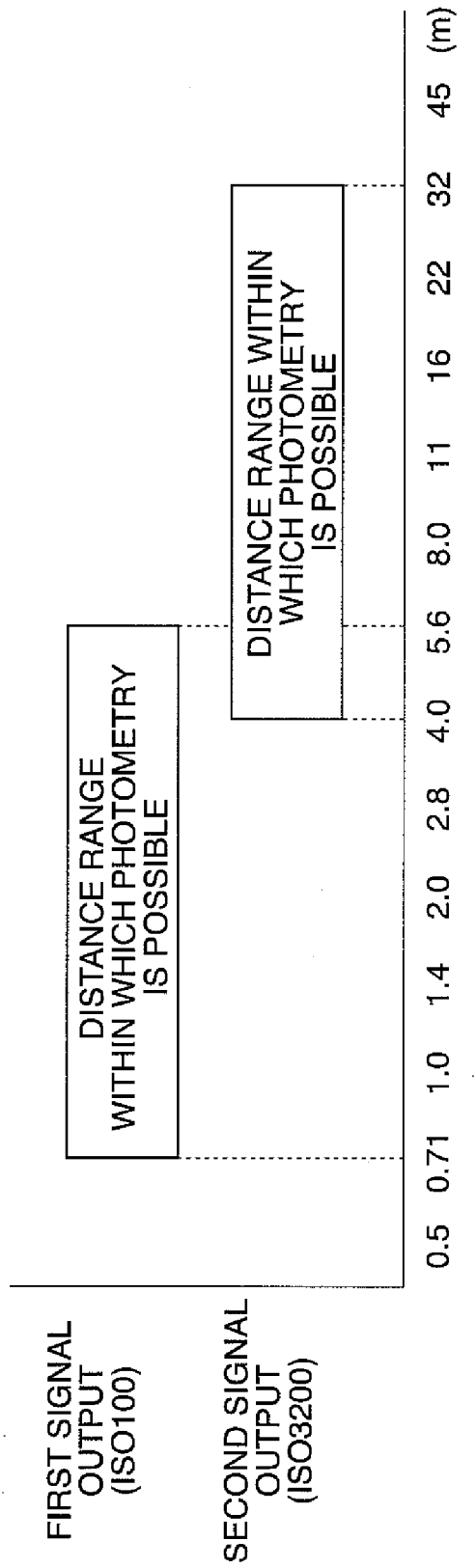
FIG. 11 is a schematic diagram showing a distance range where photometry is possible.

Next, a description will be given of a dynamic range within which light can be adjusted by the strobe light control. Assuming that the dynamic range of the image pickup device used for photometry has +3 stages and that the influence of normal light is sufficiently negligible, when the exposure conditions are properly set in the step S201, a distance within which light is adjustable can be calculated as follows:

As shown in FIG. 11, it is possible to calculate a distance between the image pickup device and a reflector plate with a reflectivity of 18%, which is approximately 0.71 m to 5.66 m away, based on the first reflected light amount R1. Further, it is possible to calculate a distance between the image pickup device and a reflector plate with a reflectivity of 18%, which is approximately 4.00 m to 32 m away, based on the second reflected light amount R2. In other words, in terms of stages which can be set within a distance range, shown in FIG. 11, the first reflected light amount R1 and the second reflected light amount R2 are shifted from each other by five stages. This makes it possible to extend the distance range allowing photometry by five stages by obtaining the first and second signal outputs through accumulation and read-out of pixel signals by one-time preliminary light emission.

Figure 12:
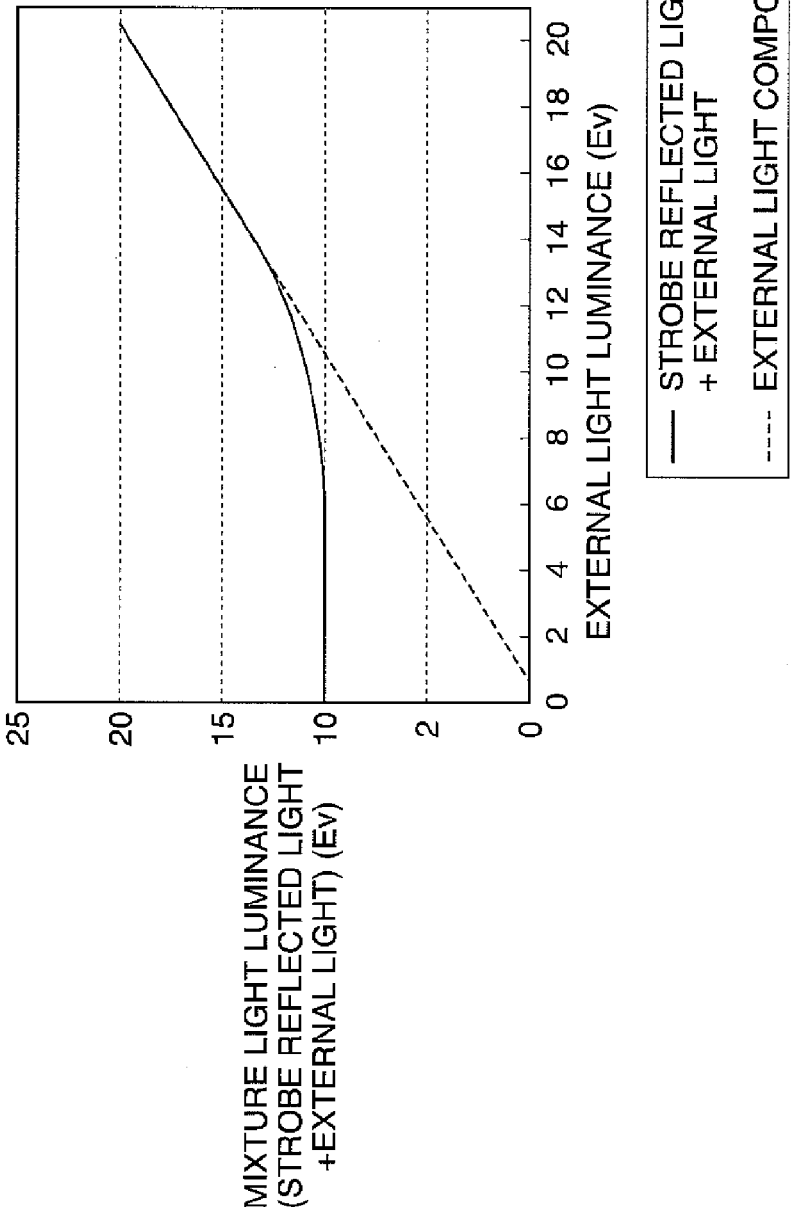
FIG. 12 is a diagram showing the relationship between external light luminance and strobe reflected light.

FIG. 12 shows the relationship between external light luminance and strobe reflected light (exposure conditions). When the luminance of normal light is low, the influence of external light is smaller, and hence the strobe reflected light becomes dominant. Therefore, by controlling the accumulation time with the aperture open, it is possible to obtain a desired amount of strobe reflected light. However, when the luminance of normal light is high, the accumulation time reaches a high speed-side control limit, which disables desired control. Therefore, it is impossible to eliminate external light.

When external light cannot be eliminated, it is required to drive the aperture to control the exposure conditions. However, when the aperture is driven, even reflected light as a strobe light component is reduced. For this reason, in order to obtain a desired amount of reflected light, there is no alternative but to increase the amount of light emitted for preliminary light emission. Further, an increase in the amount of light emitted for preliminary light emission causes an increase in a charge time for strobe light emission during a main shooting. In short, in order to eliminate external light, it is required to minimize the accumulation time and obtain strobe reflected light efficiently.

Next, a minimum accumulation time during strobe light emission in a case where the image sensor 112 is driven for a live view operation by the slit rolling shutter drive method will be described with reference to FIGS. 13 to 16.

Figure 13:
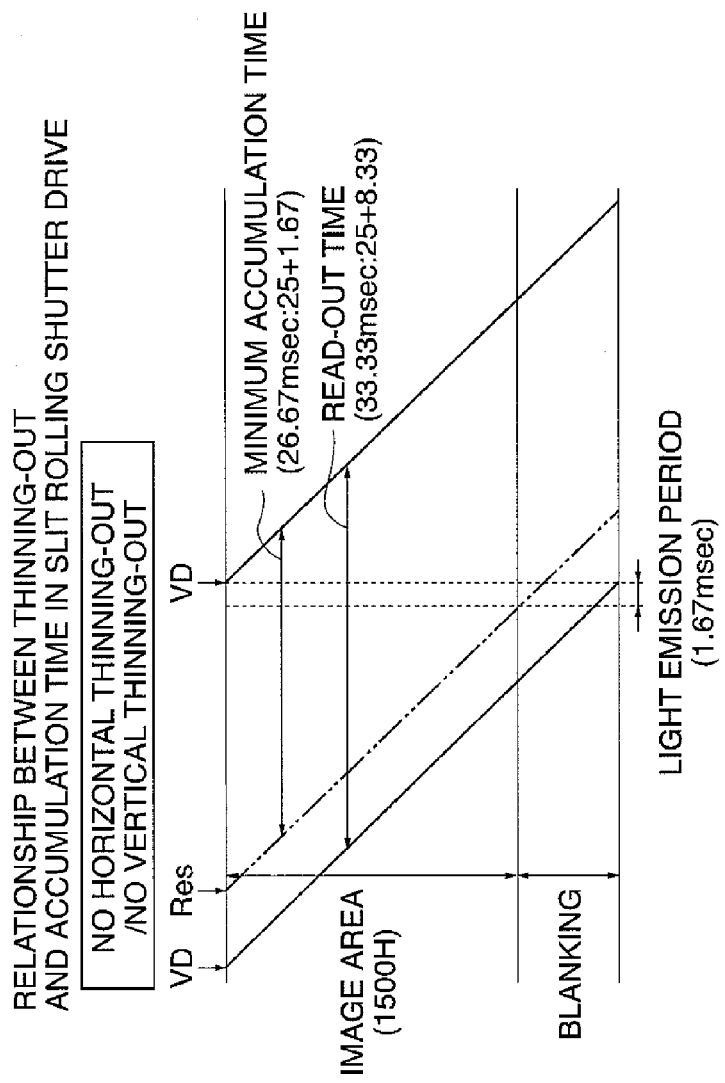
FIG. 13 is a diagram useful in explaining the relationship between thinning-out of pixels and accumulation time in a slit rolling shutter drive operation.

FIG. 13 is a diagram showing the relationship between thinning-out and the accumulation time in the slit rolling shutter drive operation. In FIG. 13, there is shown a minimum accumulation time during strobe light emission in a case where pixel signals are read out from the image pickup device at intervals of 30 fps (frames per second) without performing thinning-out of pixels either in the horizontal direction or in the vertical direction. When a photometric area covers an entire image area, preliminary light emission by the stroboscope is required to be performed such that the entire image area is irradiated with a uniform amount of strobe light. For this reason, it is required to perform flat emission over an entire image area exposure time (image area read-out time+ accumulation time), or to perform light emission during a full open section over which the entire image area is exposed.

In the former case (where flat emission is performed over the entire image area exposure time), a huge amount of energy is needed for preliminary light emission, and hence the method is not practical. Therefore, the latter method is inevitably employed. In this case, however, the full open section over which the entire image area is exposed is required to be secured as a time period corresponding to at least a preliminary light emission time plus a control error. As a result, the rest line to be shifted by the slit rolling function has its shift range restricted, and hence the accumulation time easily reaches its high speed-side limit. This causes saturation by normal light under a high-luminance condition, which disables light control.

Figure 14:
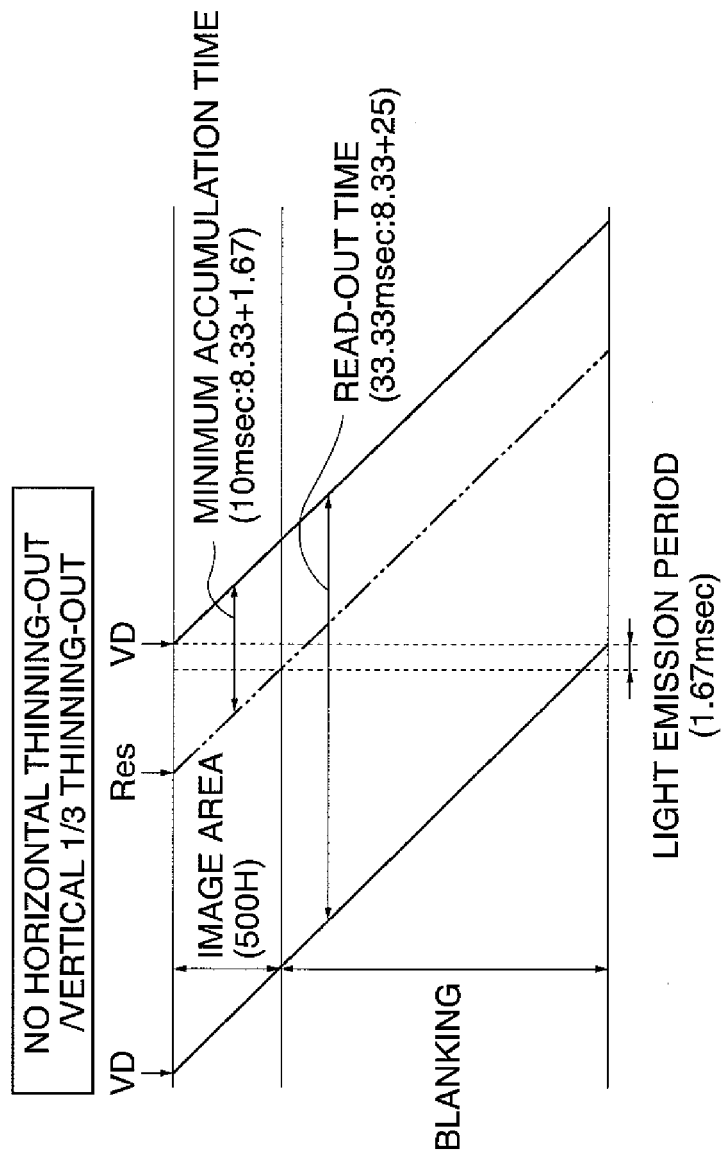
FIG. 14 is a diagram useful in explaining the relationship between the thinning-out of pixels and the accumulation time in the slit rolling shutter drive operation, which illustrates a case where pixel signals are read out from the image pickup device by a method of "no thinning-out in the horizontal direction and one-third thinning-out in the vertical direction".

The above problem can be alleviated by increasing read-out speed for reading out pixel signals from the image pickup device. In FIG. 14, there is shown a minimum accumulation time during strobe light emission in a case where pixel signals are read out from the image pickup device by a method of "no thinning-out in the horizontal direction and one-third thinning-out in the vertical direction". Further, in FIG. 15, there is shown a minimum accumulation time during strobe light emission in a case where pixel signals are read out from the image pickup device by a method of "one-half thinning-out in the horizontal direction and no thinning-out in the vertical direction" condition. Furthermore, in FIG. 16, there is shown a minimum accumulation time during strobe light emission in a case where pixel signals are read out from the image pickup device by a method of "one-half thinning-out in the horizontal direction and one-third thinning-out in the vertical direction" condition.

Figure 15:
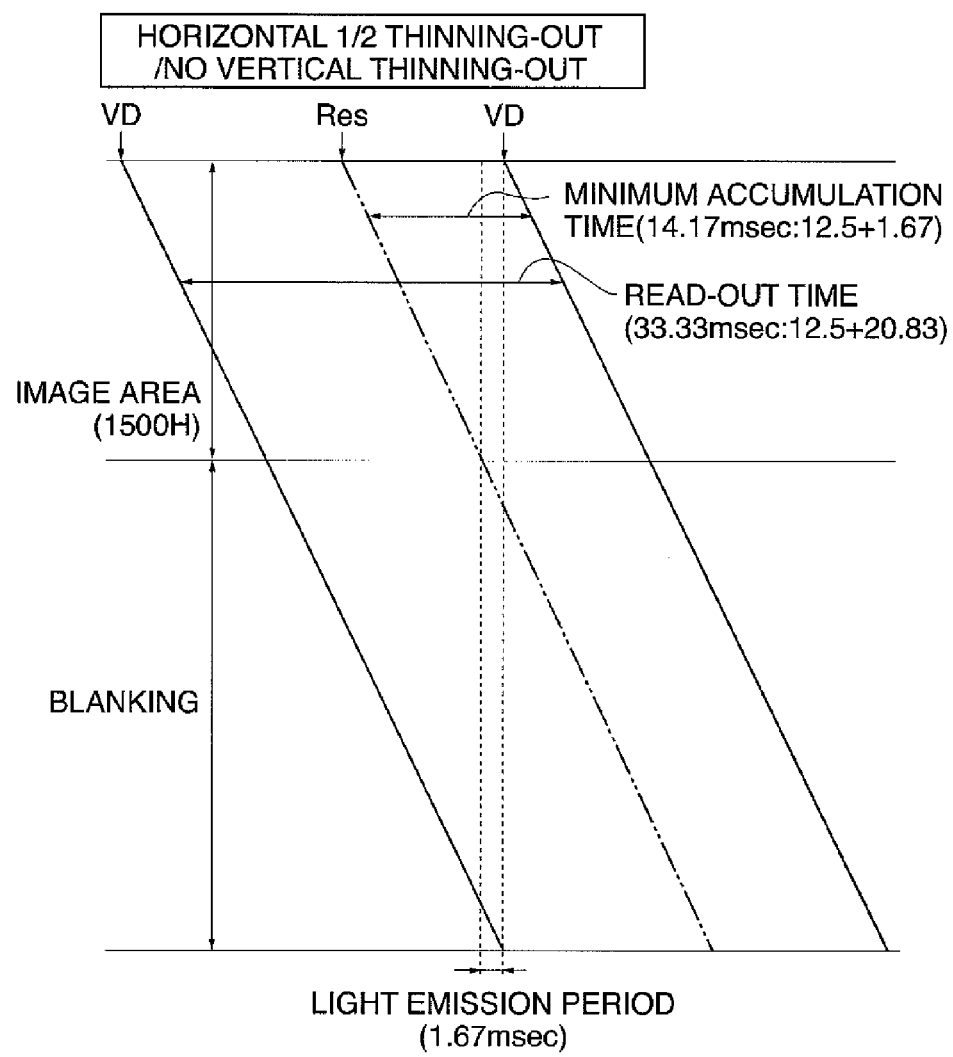
FIG. 15 is a diagram useful in explaining the relationship between the thinning-out of pixels and the accumulation time in the slit rolling shutter drive operation, which illustrates a case where pixel signals are read out from the image pickup device by a method of "one-half thinning-out in the horizontal direction and no thinning-out in the vertical direction".
Figure 16:
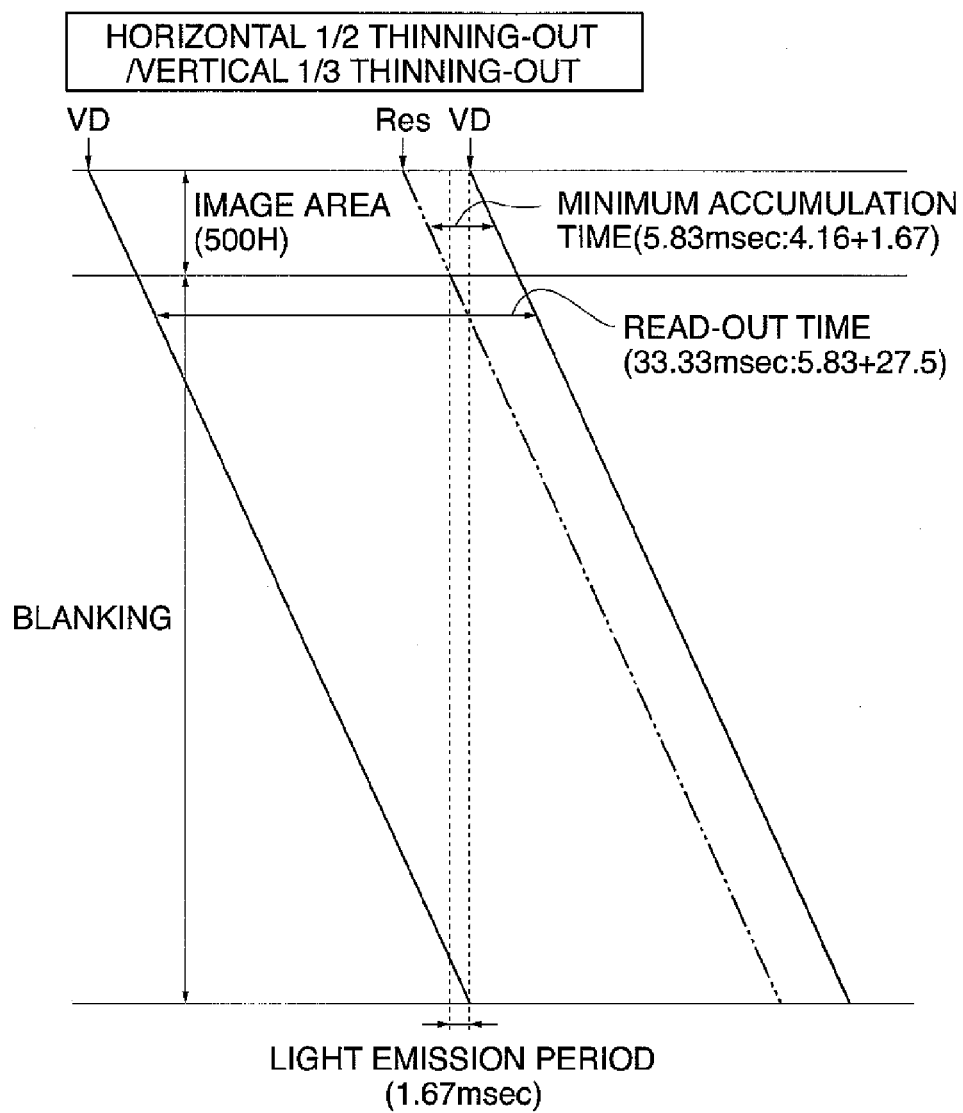
FIG. 16 is a diagram useful in explaining the relationship between the thinning-out of pixels and the accumulation time in the slit rolling shutter drive operation, which illustrates a case where pixel signals are read out from the image pickup device by a method of "one-half thinning-out in the horizontal direction and one-third thinning-out in the vertical direction".

It is understood from FIGS. 14 to 16 that it is possible to shift the limit of the minimum accumulation time toward the high speed side by increasing the read-out speed by performing thinning-out read-out of pixels in the horizontal and vertical directions at predetermined read-out intervals.

Exposure conditions and a strobe light emission amount for the main shooting are determined by the strobe light control process executed in the steps S201 to S204 in FIG. 7, and the shooting process proceeds to a step S108 of the main shooting sequence shown in FIG. 6.

Referring to FIG. 6, if it is not required to perform strobe shooting, the system controller 120 sets exposure conditions for the digital camera based on the Bv value for shooting, which was obtained in the step S104, a shooting mode designated by the user, and the parameters for shooting. On the other hand, if it is required to perform strobe shooting, the system controller 120 sets the exposure conditions for the digital camera and the strobe light emission amount based on the result of the strobe light control process executed in the step S107 (step S108). When the setting is completed, the process proceeds to a step S109. It should be noted that here, the first gain circuit setting and the first gain circuit setting are set to the same value.

The system controller 120 temporarily closes the open focal plane shutter 108 and performs spring charge to drive the front and rear curtains with the set Tv value. Further, the system controller 120 performs a normal image pickup operation (still image pickup operation) for sequentially reading out pixels from the image sensor 112 without thinning out pixels (step S109).

Thereafter, the system controller 120 performs image correction on image signals read out from the image sensor 112, by the image data controller 115, and performs image conversion, such as JPEG compression, by the image compression circuit 119, followed by recording the image in the storage medium 401. When the read-out operation for reading out pixels from the image sensor 112 is completed, the system controller 120 holds the mirror in the UP state and the shutter curtains in the open state, and returns to the step S102 to resume the live view operation.

Although in the present embodiment, the two kinds of gains are set by way of example, the number of kinds of gains is not limited to this. Further, the rate of thinning-out of pixels is not limitative, either.

As described above, according to the present embodiment, it is possible to expand the dynamic range within which light can be adjusted by the strobe light control based on reflected light reflected from an object through one-time preliminary light emission. Further, by using the thinning read-out method in combination, improvement of the high-luminance limit in light control under a high-luminance condition can be achieved. Furthermore, in a case where normal light photometry is performed, output signals amplified by a plurality of kinds of gains can be obtained, and therefore it is possible to expand the dynamic range of photometry.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-ER, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-021130 filed Jan. 31, 2007, which is hereby incorporated by reference herein in its entirety.

What is claimed is:

1. An image pickup device comprising:
   a pixel array formed by a plurality of pixels including photoelectric conversion elements and arranged in a row direction and in a column direction;
   a pixel read-out unit configured to read out selected pixel signals from said pixel array;
   an amplifier unit configured to be capable of having at least two gains set therein, and amplify and output the pixel signals read out from said pixel array by said pixel read-out unit;
   a selecting unit configured to select a plurality of pixels from said pixel array in the row direction or in the column direction; and
   a gain-setting unit configured to alternately set different gains in said amplifier unit for a number of rows or columns where the number is less than the total number of complete rows or complete columns, selected from said pixel array by said selecting unit at intervals of a predetermined number of complete rows or complete columns such that the pixel signals amplified by the different gains can be obtained upon one-time read-out from said pixel array by said pixel read-out unit;
   wherein said gains are set in said amplifier unit such that said pixel signals read out from one said pixel array in the row direction or one said pixel array in the column direction are amplified and output by the same gain.

2. An image pickup device as claimed in claim 1, wherein said pixel read-out unit is capable of performing pixel-thinning out for said pixel array in the row direction or in the column direction at predetermined thinning intervals to read out the pixel signals.

3. An image pickup device as claimed in claim 1, wherein, for said intervals of a predetermined number of complete rows or complete columns, the predetermined number of complete rows or complete columns is two or more.

4. An image pickup apparatus comprising:
   an image pickup device including a pixel array formed by a plurality of pixels including photoelectric conversion elements and arranged in a row direction and in a column direction, a pixel read-out unit configured to read out selected pixel signals from said pixel array, an amplifier unit configured to be capable of having at least two gains set therein, and amplify and output the pixel signals read out from said pixel array by said pixel read-out unit, a selecting unit configured to select a plurality of pixels from said pixel array in the row direction or in the column direction, and a gain-setting unit configured to alternately set different gains in said amplifier unit for a number of rows or columns where the number is less than the total number of complete rows or complete columns, selected from said pixel array by said selecting unit at intervals of a predetermined number of complete rows or complete columns such that the pixel signals amplified by the different gains can be obtained upon one-time read-out from said pixel array by said pixel read-out unit, wherein said gains are set in said amplifier unit such that said pixel signals read out from one said pixel array in the row direction or one said pixel array in the column direction are amplified and output by the same gain;

a photometric unit configured to measure reflected light from an object caused by preliminary light emission performed before shooting, based on the pixel signals read out from said image pickup device;

a light emission amount-calculating unit configured to calculate a light emission amount required for the shooting, based on a result of the photometric measurement by said photometric unit;

a light-emitting unit configured to emit light in an amount corresponding to a result of the calculation by said light emission amount-calculating unit; and a preliminary light emission photometric unit configured to control said amplifier unit for accumulation of pixel signals in said image pickup device during the preliminary light emission, and perform photometry using at least one of a plurality of kinds of pixel signals amplified by different gains and obtained from said image pickup device.

5. An image pickup apparatus as claimed in claim 4, further comprising a normal light photometric unit configured to control said amplifier unit for accumulation of pixel signals in said image pickup device under a normal light condition, and perform normal light photometry using at least one of a plurality of kinds of pixel signals amplified by different gains and obtained from said image pickup device, and wherein gain configuration of said amplifier unit for the accumulation of pixel signals in said image pickup device under the normal light condition is identical to gain configuration of said amplifier unit for the accumulation of pixel signals in said image pickup device during the preliminary light emission.

6. An image pickup apparatus as claimed in claim 4, having a live view function for sequentially display images based on the pixel signals read out from said image pickup device.

7. A method of controlling an image pickup apparatus having an image pickup device including a pixel array formed by a plurality of pixels including photoelectric conversion elements and arranged in a row direction and in a column direction, a pixel read-out unit configured to read out selected pixel signals from the pixel array, an amplifier unit configured to be capable of having at least two gains set therein, and amplify and output the pixel signals read out from the pixel array by the pixel read-out unit, a selecting unit configured to select a plurality of pixels from said pixel array in the row direction or in the column direction, the method comprising:

a photometric measurement step of measuring reflected light from an object caused by preliminary light emission performed before shooting, based on the pixel signals read out from the image pickup device;

a light emission amount-calculating step of calculating a light emission amount required for the shooting, based on a result of the photometric measurement in said photometric measurement step;

a light-emitting step of emitting light in an amount corresponding to a result of the calculation in said light emission amount-calculating step;

a preliminary light emission photometric measurement step of controlling the amplifier unit for accumulation of pixel signals in the image pickup device during the preliminary light emission, and perform photometry using at least one of a plurality of kinds of pixel signals amplified by different gains and obtained from the image pickup device; and a gain-setting step of alternately setting different gains in said amplifier unit for a number of rows or columns where the number is less than the total number of complete rows or complete columns, selected from said pixel array by said selecting unit at intervals of a predetermined number of complete rows or complete columns such that the pixel signals amplified by the different gains can be obtained upon one-time read-out from said pixel array by said pixel read-out unit, wherein said gains are set in said amplifier unit such that said pixel signals read out from one said pixel array in the row direction or one said pixel array in the column direction are amplified and output by the same gain.

* * * * *